United States Patent [19]

Del Mundo et al.

[11] Patent Number: 4,659,268
[45] Date of Patent: Apr. 21, 1987

[54] COMPOSITE BLIND FASTENERS

[75] Inventors: Alfredo R. Del Mundo, Cerritos; Dean S. Klivans, Chatsworth, both of Calif.

[73] Assignee: Rockwell International Corporation, El Segundo, Calif.

[21] Appl. No.: 863,496

[22] Filed: May 15, 1986

[51] Int. Cl.$^4$ .................. F16B 13/04; F16B 39/02
[52] U.S. Cl. ........................... 411/34; 411/82; 411/901
[58] Field of Search .................. 411/34–38, 411/43, 15, 69, 82, 258, 900, 901, 904; 405/260

[56] References Cited

U.S. PATENT DOCUMENTS 2,939,805  6/1960  Johnson .......................... 411/258
3,772,957  11/1973  Newton .......................... 411/15
4,478,544  10/1984  Strand ............................ 411/34

Primary Examiner—Gary L. Smith
Assistant Examiner—Neill Wilson
Attorney, Agent, or Firm—Charles T. Silberberg; Max Geldin

[57] ABSTRACT

Composite blind fasteners are disclosed, formed of a woven composite tube and a mandrel mounted within the tube. The mandrel has an encapsulation member mounted at its inner end, e.g., in the form of an O-ring, containing a first reservoir of curable resin and a second reservoir of activator for curing the resin, the two reservoirs being separated by a fracturable membrane. When the mandrel is pulled through the tube, it applies pressure to the O-ring housing the reservoirs, causing fracture of the membrane separating the reservoirs and resulting in mixing of the resin and activator. As the mandrel is pulled, a bulb of the resin mixture is formed against the substrate or structural component, and on curing of the resin, the resulting hard resin bulb locks the fastener in place on the substrate. Such pulling action of this mandrel can also cause rupture of the O-ring, whereby a portion of the resin mixture passes through the O-ring and is forced through the interstices of the woven tube wall, so that a portion of the bulb forming the locking member when the resin is cured can be disposed outside the composite tube as well as within the tube, thereby enhancing the locking effect.

22 Claims, 6 Drawing Figures

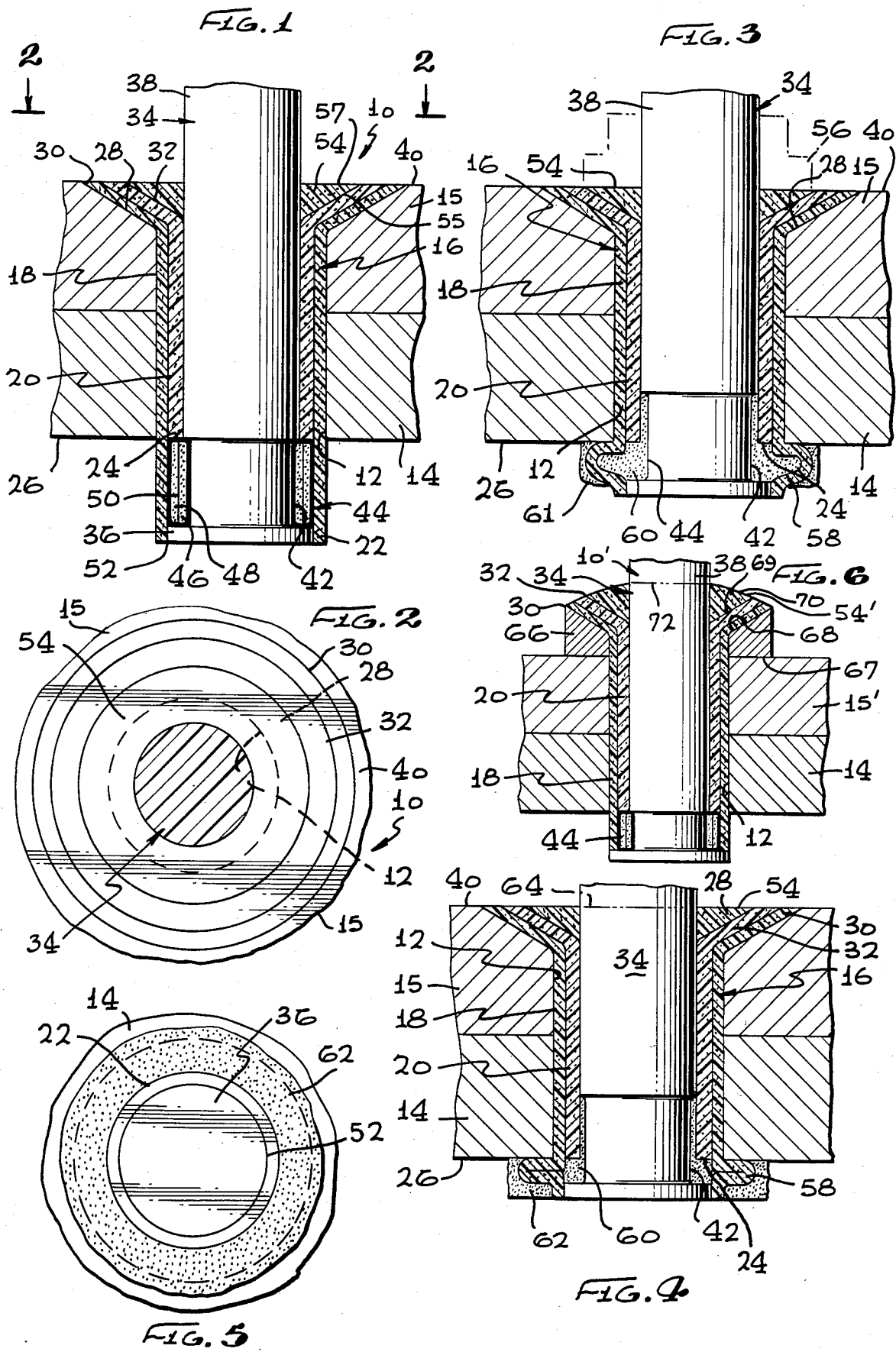

COMPOSITE BLIND FASTENERS

BACKGROUND OF THE INVENTION

The present invention relates to the production of composite fasteners and is particularly concerned with the production of composite blind self-sealing fasteners for use on composite and metallic structures, such as integral fuel tank structures for aircraft.

Structural components particularly advantageous for aircraft and other vehicles, e.g., in the form of beams, ribs and other structural components, such as are employed in the construction of aircraft fuel tanks, are often made of lightweight material relative to their strength and stiffness. Such materials are composite materials, which, as is well-known in the art, are comprised of fibers of various types, such as graphite fibers in cloth and/or tape orientations, impreonated with a binder material, usually a plastic, such as an epoxy resin.

Fasteners heretofore oenerally employed in conjunction with such composite structural components have been metallic fasteners. However, the use of such metallic fasteners on composite structures has the disadvantage that the metallic fasteners are incompatible with composite structures due to the difference in thermal expansion of the metallic components in relation to composite structural components, resulting in insecure or loose connections, or leakage in the case of fuel tank structures, especially as a result of substantial temperature variations, e.g., during operation of an aircraft.

Adhesively securable fasteners are known, for example, as described in U.S. Pat. No. 4,425,065. The patent discloses a fastener wherein an adhesive forms an external bulb to hold the fastener in position. Examples of other adhesively secured fasteners include U.S. Pat. Nos. 4,100,954; 4,102,030; 4,419,805; and 4,514,125. However, these prior art adhesively securable fasteners are relatively complex and expensive and/or have other disadvantages, which have heretofore rendered them unsuitable for use as fasteners on composite structures, particularly for use as sealing fasteners on aircraft fuel tank composite structures.

It is an object of the present invention to provide an improved composite self-sealing fastener.

Another object of the invention is the provision of composite self-sealing blind fasteners for use with composite structural components, particularly the composite components of fuel tank structures employed in aircraft.

A still further object is to provide a self-sealing composite blind fastener of the above type employing curable resin sealants, for use with composite structural components, and which is of relatively simple construction, readily operable and dependable, and which can be used in the field, e.g., for battle repair damage.

SUMMARY OF THE INVENTION

The above objects and advantages of the invention are achieved by the provision of a composite blind fastener formed of a woven composite tube and a mandrel mounted within the tube and having thereon a first reservoir of curable resin and a second reservoir of activator for curing the resin, such reservoirs being contained within an encapsulation member, for example, in the form of an O-ring, with a fracturable membrane separating the two reservoirs. When the mandrel is pulled through the tube, it applies pressure to the O-ring housing the reservoirs, causing fracture of the membrane separating the reservoirs, and resulting in mixing of the resin and activator. As the mandrel is pulled, a bulb of the resin mixture is formed against the substrate or structural component, and on curing of the resin, the resulting hard resin bulb locks the fastener in place on the substrate.

During such operation, as the mandrel is pulled outwardly with respect to the composite tube, the inner or lower end of the composite tube also is caused to move outwardly against the substrate, and the fibers of the tube are flared outwardly at its inner end against the substrate as the O-ring containing the resin and activator reservoirs are squeezed. The shearing action of the mandrel against the O-ring causes rupture of the membrane between the reservoirs and can also cause rupture if the O-ring. This results in the mixing of the resin and activator, and a portion of such resin mixture passes throuqh the O-ring and is forced through the interstices of the woven tube wall, so that a portion of the bulb forming the locking member when the resin is cured can be disposed outside the composite tube as well as within the tube, thereby enhancing the locking effect.

The outer or upper end of the composite tube is flared and the mandrel extends outwardly from the flared portion of the tube. A collar is placed around the mandrel and over the flared end of the tube. In one embodiment, the flared end of the tube and the collar are disposed in a countersunk portion of the substrate, while in another non-countersunk embodiment, a collar insert is placed on the substrate, and the flared end of the tube and the collar are supported on the collar insert. By the application of pressure as by a tool against the collar, the outwardly extending end of the mandrel can be pulled with respect to the tube, as noted above, to effect the fracture of the membrane separating the resin and activator reservoirs in the O-ring, as well as possible fracture of the O-ring.

Following operation of the mandrel to form the resin-activator mixture and curing of such mixture to form the locking bulb, as noted above, the portion of the mandrel extending outwardly beyond the substrate can be trimmed.

The composite fastener of the invention is formed of only a few components, is readily assembled, and is easily operated to provide a self-sealing fastener, especially for use with composite structures, such as integral fuel tank structures. There is essentially no difference in thermal expansion of the composite fastener with respect to the composite structures, and hence, the composite fastener remains securely positioned on the fastened composite components during substantial or sudden changes in temperature.

DESCRIPTION OF THE DRAWINGS

FIG. 1 is a section in elevation of one embodiment of a composite blind fastener according to the invention, mounted in a composite structure;

FIG. 2 is a plan view of the fastener assembly of FIG. 1, on line 2—2 of FIG. 1;

FIG. 3 illustrates the formation of the bulb and seal as the mandrel of the fastener is pulled to actuate formation of the bulb;

FIG. 4 illustrates the position of the bulb and seal as the mandrel is pulled to its outermost position on the fastener;

FIG. 5 is a bottom view Of the actuated fastener assembly of FIG. 4; and

FIG. 6 is a section in elevation of another embodiment of the composite fastener of the invention.

DETAILED DESCRIPTION OF THE INVENTION AND PREFERRED EMBODIMENTS

Referring to FIGS. 1 and 2 of the drawings, numeral 10 is one form of a composite blind fastener according to the invention, positioned within a hole 12 of a pair of composite structural members 14 and 15 to be fastened together in an integral fuel tank of an aircraft.

The fastener 10 comprises a woven composite tube 16 formed of an outer composite tube or tube portion 18 and an inner composite tube portion 20, the outer and inner tubes 18 and 20 being woven together.

The flexible composite tubes 18 and 20 are in the form of a fiber reinforced composite material, such as graphite, impregnated with a tough resinous polymer, which can be thermosetting, such as epoxy or epoxy-novelac resin. The resin is partially cured, e.g., "B" staged, or between "B" and "C" staged, to permit final curing by the application of heat. Other reinforcing fibers, such as boron, fiberglass or fibers of an organic material, such as a polyamide, e.g., Kevlar, understood as comprised of poly (paraphenyl-terephthalamide), can be employed in place of graphite. Other heat curable resins which can be employed include partially cured polyamide or polyimide resin, as well as high temperature thermoplastic material, such as the resin marketed as "Peek" resin, understood to be a polyether ether ketone resin, polyphenylene sulfone and polycarbonate resins.

The woven composite material of which the tubes 18 and 20 are formed are known as "pre-preg" composite material.

It will be noted that the woven composite outer tube 18 is longer than that of the woven composite inner tube 20, the inner end 22 of the outer composite tube 18 extending substantially below the inner end 24 of the inner composite tube 20. It is thus seen that the inner end 22 of the outer composite tube 20 extends substantially beyond the substrate or composite structural member 14, and the inner end 24 of the inner tube 20 is approximately at a depth level with the outer surface 26 of the composite member 14, When the fastener is placed in position within the hole 12 of composite members 14 and 15.

The composite member 15 adjacent the outer end of the fastener 10 has a countersunk area 28, and the outer ends of the outer tube 18 and of the inner tube 20 are flared at 30 and 32, respectively, and positioned in contact with the countersunk surface 28.

A mandrel 34 is positioned within the inner woven composite tube 20 and extends inwardly a distance such that the inner end 36 of the mandrel is disposed adjacent the inner end 22 of the outer composite tube 18. The mandrel is of a predetermined length such that the outer end 38 of the mandrel extends a substantial distance beyond the outer surface 40 of the composite structural member 15, permitting the outer end 38 of the mandrel to be manually grasped with the fingers or with a tool to pull the mandrel outwardly, as described in greater detail below. The mandrel 34 is a rigid member preferably formed of a suitable plastic or composite material of the types described above.

However, the plastic or composite material of which the mandrel is formed is not a pre-preg composite material but, rather, is a fully cured composite.

The mandrel 38 has a circumferential groove 42 around the inner end of the mandrel adjacent the inner end of the outer tube 18. Positioned in the circumferential groove 42 is a flexible encapsulating member or O-ring 44 containing therein a first circumferential reservoir 46 and a second concentric circumferential reservoir 48, the two reservoirs being separated by a fracturable or rupturable, essentially cylindrical membrane 50.

The encapsulating member or O-ring 44 is formed of a suitable flexible material which can be ruptured by the shearing force resulting from movement of the mandrel in the manner noted in greater detail below. Suitable materials of which the O-ring 44 can be formed include flexible rubber or synthetic rubber-like flexible material, such as polyurethane, polyethylene or polyvinyl chloride. The flexible rupturable membrane 50 can also be formed of relatively thin rubber-like materials of substantially the same composition as the O-ring 44, noted above.

One of the reservoirs 48 within the O-ring 44 contains a curable resin, such as a partially cured epoxy or epoxy-novelac resin, which can be in a liquid form. Other polymerizable monomers or partially cured resins, such as polyesters, silicone, polyurethanes, and the like, can be employed.

The other reservoir 46 contains a curing agent or cross-linking agent for the resin adhesive in reservoir 48, such curing agents being well-known in the art; e.g., primary and secondary amines, such as ethylene diamine, can be used as a curing agent for epoxy resins.

The flexible O-ring containing the encapsulated separated reservoirs, containing curable resin and curing agent, is bonded along its inner peripheral groove 42 to the surface of the mandrel 34 and is bonded on its outer peripheral surface to the adjacent inner surface of the outer woven composite tube 18 adjacent the inner end 22 thereof. It is noted that one edge of the O-ring 44 is disposed adjacent the inner end 24 of the inner woven composite tube 20.

The inner end of the mandrel 34 beyond the groove 42 therein is bonded at 52 to the inner end 22 of the outer composite woven tube 18.

A collar 54 is positioned around the mandrel 34 and placed in the countersunk area 28. The collar 54 has an outwardly inclined inner surface 55 in contact with the flared outer end 32 of the inner composite tube 20. The outer surface 57 of the collar 54 is flush with the outer surface 40 of the composite structural member or substrate 15. The collar 54 can be composed of any suitable material, such as a phenolic resin, and which can also contain, for example, chopped reinforcing fibers, such as boron fibers or fiberglass.

In operation of the composite fastener for fastening the composite structural members 14 and 15 together, the assembled components of the fastener, including the combination of outer and inner composite tubes 18 and 20, the mandrel 34 received therein and bonded at its lower end to the outer composite tube 18, and the O-ring 44 positioned in the circumferential groove 42 of the mandrel and also secured to the inner end of outer tube 18, are inserted into the hole 12 of the composite members 14 and 15, with the flared outer ends 30 and 32 of the woven composite tubes 18 and 20, respectively, positioned in the countersunk area 28 in the outer surface of the composite member 15. The collar 54 is then inserted over the outer end 38 of the mandrel and positioned in the countersunk area 28, overlying the flared outer end 32 of the inner woven composite tube 20.

The tool 56 shown in phantom lines in FIG. 3 is then slid over and around the outer end 38 of the mandrel 34 and positioned in contact with the outer surface of the collar 54, to set the collar. While pressing the collar downwardly by means of tool 56 to maintain the composite woven outer and inner tubes 18 and 20 in fixed position, the outer end 38 of the mandrel 34 is grasped to draw the mandrel outwardly or upwardly within the tubes 18 and 20, as viewed in FIG. 3, causing the mandrel to roll over the encapsulation member or O-ring 44, which is held in position against the inner end of the outer composite tube 18 and is restrained against upward movement by the abutting inner end 24 of the inner composite tube 20.

Such rolling action of the mandrel aoainst the O-ring 44 fractures or ruptures the fracturable membrane 50 between the reservoirs 46 and 48 in the O-ring, by contact and shearing action of the O-ring against the inner end 24 of the inner composite tube 20, resulting in mixing of the curing agent or activator with the resin.

Also, as the mandrel is pulled outwardly, viewing FIG. 3, since the inner or lower end of the mandrel 34 is attached to the lower end 22 of the outer composite tube 18, the inner end of the outer tube 18 is pulled upwardly by the mandrel into contact with the outer surface 26 of composite member 14, as seen in FIG. 3, forming a bulb 58 and forcing a portion of the O-ring 44 containing the resin-activator mixture at 60 into the bulb 58. In preferred practice, where the O-ring 44 is also rupturable and hence also ruptures as a result of the above-noted shearing action during outward pulling of the mandrel 34, a portion of the resin-activator mixture 60 within the bulb 58 of tube 18 is forced out of the O-ring and exudes through the interstices of the inner end portion or bulb 58 of the outer tube to the exterior of the bulb, as at 61. Further outward pulling of the mandrel 34, as seen in FIG. 4, causes further construction of the bulb 58 against the outer surface 26 of structural member 14 and causes further extrusion of the resin-activator mixture through the small perforations or slots in the woven outer tube 18 to the exterior of the bulb, as at 62. It will be noted in FIGS. 3 and 4 that a portion of the resin-activator mixture 60 remains within the groove 42 around the inner end of the mandrel.

It will be understood that the extent of bulb free formation 58 shown in FIGS. 3 and 4 can be varied as desired by the extent of outward displacement of the mandrel with respect to the composite tubes. Thus, if desired, the extent of bulb formation can be maintained as shown in FIG. 3, without any further outward pull on the mandrel.

The assembly of FIG. 3 or FIG. 4 can be subjected to a conventional cure cycle as, for example, by heat curing the resin mixture within and externally of the bulb 58 in an autoclave, at sufficient pressure and temperature, e.g., at 85 psi and 350° F. If the resins employed are ultraviolet, light-curable resins, the assemblv can be cured by being subjected to a suitable source of ultraviolet light. When heat curing is employed, curing is effected by heat conduction through the mandrel 34, and when ultraviolet curing is employed, curing is effected by passage of UV through the mandrel. Alternatively, the resin and activator or curing agent employed can be of a type which is curable at room temperature. In any event, it is preferred to employ a rapid cure cycle.

During curing, outward pull on the mandrel is preferably maintained, as by suitable clamping means (not shown), of the outer end 38 of the mandrel on the tool 56.

Following curing, a hard resin bulb 60, 61 (FIG. 3) or 60, 62 (FIG. 4) is formed both inside and outside of the tubular bulb 58, thus locking the fastener against the outer surface 26 of the composite structural member 14 and securely fastening the structural members 14 and 15 together.

Following curing, the tool 56 and clamp employed during curing are removed, and the outer end 38 of the mandrel is trimmed off along the dotted line 64, flush with the outer surface 40 of the composite member 15. The collar 54 remains in position as part of the fastener, following curing.

The countersunk fastener of FIGS. 1 to 5 is preferably employed where the substrate requires a mold line or smooth surface, i.e., at the surface 40 of the composite member 15, as shown in FIG. 4.

However, where the substrate does not require such mold line or smooth surface, the non-countersunk embodiment of FIG. 6 can be employed. Thus, referring to FIG. 6, it is seen that the composite member 15' adjacent the outer end of fastener 10' is not countersunk. Fastener 10' has substantially the same construction as fastener 10 of FIG. 1, except that a collar insert 66 having a planar inner surface 67 is first placed on the surface of the composite member 15' around the hole 12. The assembled fastener 10' is then inserted into the hole 12, as in the case of fastener 10, except that the flared outer ends 30 and 32 of the woven composite tubes 18 and 20, respectively, are positioned on the outwardly inclined or flared outer surface 68 of the collar insert 66. The collar 54', similar to collar 54 and having an outwardly inclined inner surface 69, is then inserted over the outer end 38 of the mandrel 34 and overlying the flared outer end 32 of the inner woven composite tube 20, the flared outer ends of tubes 18 and 20 thus being sandwiched between the collar 54' and collar insert 66. The collar insert 66 is of substantially the same composition as collar 54', and collar 54' has a curved outer surface 70.

Following installation and curing of the fastener 10' of FIG. 6, the outer end 38 of the mandrel is trimmed off along the dotted line 72, around the outer end of collar 54'. It is thus seen that in the embodiment of FIG. 6, the outer end of fastener 10' extends outwardly from composite member 15' and can be used where the smooth substrate surface provided by the countersunk fastener of FIG. 1 is not necessary.

It will be understood that further variations of the fastener structure can readily be made within the scope of the invention. Thus, if desired, the composite tube 16 can be in the form of a single woven tube rather than a tube formed by attachment of outer and inner composite tubes, as at 18 and 20. Also, the outer ends of the woven composite tubes 18 and 20 need not be flared. In addition, prior to installation in a hole of a substrate, e.g., an integral fuel tank, the assembled components of the fastener optionally can be initially dipped into a resin, e.g., epoxy, and activator mixture, to provide additional assurance that the fastener is tightly secured to the wall of the hole following curing of the fastener assembly.

Further, if desired, the encapsulation member or O-ring 44 can be made of a flexible material which does not rupture or fracture by the rollinq or shearing action of the O-ring during outward pull on the mandrel. In this case, the resin mixture will be retained within the tubular bulb 58, without any of the resin-activator mixture passing through the O-ring and through the tubular bulb to the exterior thereof, as at 61 and 62 in Fiqs. 3 and 4.

As previously noted, the composite blind fastener of the invention is particularly applicable for use in securing composite structural components, especially in the aircraft industry, such as in sealing integral fuel tanks. However, it will be understood that the composite fastener of the invention can be employed for securing other structural components, e.g., constructed of metal, wood, and the like, utilizing resins in the pre-preo tubes and O-ring that have curing temperatures that will not cause degradation of the parent materials being joined.

From the foregoing, it is seen that the above objects and advantages are achieved by the composite blind self-sealing fasteners of the invention in the form of a simple composite fastener formed of a minimum of components which can be readily assembled and operated.

Since various further changes and modifications of the invention will occur to, and can be made readily by, those skilled in the art without departing from the invention concept, the invention is not to be taken as limited except by the scope of the appended claims.

What is claimed is:

1. A composite fastener which comprises:
a woven composite outer tube,
a woven composite inner tube positioned around the inside of the outer tube, the inner end of said outer tube extending beyond the adjacent end of said inner tube,
a mandrel positioned within said inner tube and having a circumferential groove around the inner end of said mandrel adjacent the inner end of said outer tube, the mandrel having an outer end extending beyond the outer end of both said tubes,
a flexible O-ring mounted in the groove around said mandrel, said O-ring comprising a first reservoir containing a curable resin, a second reservoir containing an activator to effect curing of said resin and a fracturable membrane separating said reservoirs, said O-ring extending around the inner end of said outer tube and beyond the inner end of said inner tube, and
means for maintaining the outer end of said tubes in fixed position on a substrate to permit pulling the outer extending end of said mandrel with respect to said tubes, to draw said mandrel outwardly within said tubes, and causing said membrane to fracture by contact of said O-ring against the inner end of said inner tube and resulting in mixing of said activator with said resin in said O-ring and forcing the inner end of said outer tube against the substrate to form a bulb against the substrate, thereby locking the fastener on the substrate when the resin is cured.

2. The fastener of claim 1, the outer ends of said outer and inner tubes being outwardly flared for positioning in a countersunk area on said substrate, said means for maintaining the outer end of said tubes in fixed position on said substrate to permit pulling the outer extending end of said mandrel with respect to said tubes, including a collar mounted around said mandrel and in contact with the flared outer end of said tubes in said countersunk area.

3. The fastener of claim 1, said means for maintaining the outer end of said tubes in fixed position on said substrate to permit pulling the outer extending end of said mandrel with respect to said tubes, including a collar mounted around said mandrel, said collar having an outwardly inclined inner surface, and a collar insert mounted around said mandrel and in contact with said substrate, said collar insert having a flared outer surface, the outer ends of said outer and inner tubes being outwardly flared and sandwiched between said collar and said collar insert.

4. The fastener of claim 2, said mandrel having a predetermined length, said mandrel extending at its inner end to the inner end of said outer tube, the outer end of said mandrel extending beyond said collar and permitting placement of a tool around the outer end of said mandrel and against said collar to permit said pulling of said mandrel with respect to said collar.

5. The fastener of claim 3, said mandrel having a predetermined length, said mandrel extending at its inner end to the inner end of said outer tube, the outer end of said mandrel extending beyond said collar and permitting placement of a tool around the outer end of said mandrel and against said collar to permit said pulling of said mandrel with respect to said collar.

6. The fastener of claim 1, said mandrel formed of a material such as to permit the outer end of said mandrel extending from the substrate to be trimmed following curing of the resin.

7. The fastener of claim 1, said O-ring being fracturable and bonded to said mandrel and to the inner end of said outer tube, the inner end of said mandrel beyond said O-ring being bonded to the inner end of said outer tube, whereby during pulling of said mandrel, both the O-ring and membrane are fractured and a portion of the resulting resin-activator mixture is forced through the interstices of the inner end of the outer woven tube, forming an additional bulb portion against the substrate to further aid in locking the fastener against the substrate.

8. The fastener of claim 1, said woven tubes comprised of pre-preg fibers selected from the group consisting of graphite, boron, qlass and organic fibers.

9. The fastener of claim 8, said fibers being impregnated with a thermosetting or thermoplastic resin.

10. The fastener of claim 9, said resin being selected from the group consisting of room temperature curing, heat curable or ultraviolet light-curable thermosetting and high temperature thermoplastic resins.

11. The fastener of claim 10, said resin being selected from the group consisting of partially cured epoxy, epoxy-novelac resin, polyamide or polyimide resin.

12. The fastener of claim 10, said mandrel being formed of plastic or composite material.

13. The fastener of claim 12, said mandrel being formed of a material comprised of pre-preg fibers selected from the group consisting of graphite, boron, glass and organic fibers, and said fibers being impregnated with a thermosetting or thermoplastic resin.

14. The fastener of claim 4, said collar comprised of a phenolic material.

15. The fastener of claim 12, said phenolic material including chopped reinforcing fibers.

16. A composite blind fastener especially adapted for use on composite structures which comprises:
a woven composite tube formed of an outer tube portion and an inner tube portion, the tube portions being woven together, one end of the outer tube portion extending beyond the adjacent one end of the inner tube portion, the outer ends of said outer and inner tube portions being outwardly flared, a mandrel positioned within said inner tube portion and extending to said one end of the outer tube portion, said mandrel having a circumferential groove around one end thereof adjacent said one end of the outer tube portion and beyond said one end of the inner tube portion, said one end of said mandrel beyond said groove being bonded to said one end of the outer tube portion, the other end of said mandrel extending beyond the other outwardly flared ends of said outer and inner tube portions, a flexible rupturable resin encapsulation member positioned around said groove and bonded to said mandrel, said member including a first reservoir containing a curable resin and a second reservoir containing an activator to cure said resin, and a rupturable membrane separating said reservoirs, said reservoirs being essentially concentric in said groove, the outer periphery of said encapsulation member being in contact with and bonded to the inner wall of said outer tube portion beyond said one end of the inner tube portion and in contact with said one end thereof, a collar positioned around said mandrel and in contact with the outwardly flared portion of said inner tube portion, whereby application of pressure by a tool applied to said collar to maintain the tube portions in fixed position on the substrate, and pulling the other end of the mandrel extending beyond the tube portions, draws the mandrel outwardly within the tube portions and causes the mandrel to roll over the encapsulation member held in position adjacent said one end of the outer tube portion, shearing and rupturing said rupturable encapsulation member and said rupturable membrane, resulting in mixing of said activator and said resin in said encapsulation member, and pulling said one end of said outer tube portion into contact with said substrate and forcing a portion of the resin-activator mixture out of said encapsulation member and through the interstices of said one end portion of said outer tube portion to the exterior thereof, the curing of said resin-activator mixture forming a bulb against the substrate to lock the fastener in position thereon.

17. The fastener of claim 16, the outwardly flared ends of said outer and inner tube portions being positioned in a countersunk area of a substrate and said collar also being positioned in said countersunk area.

18. The fastener of claim 16 including a collar insert adjacent said collar, the outwardly flared ends of said outer and inner tube portions being sandwiched between said collar and said collar insert.

19. The fastener of claim 16, said mandrel formed of a plastic or composite material such as to permit the outer end of said mandrel extending from the substrate beyond said collar to be trimmed following curing of the resin.

20. The fastener of claim 19, said woven tube and said mandrel comprised of pre-preg fibers selected from the group consisting of graphite, boron, glass and organic fibers, and said fibers being impregnated with a thermosetting or thermoplastic resin.

21. The fastener of claim 20, said resin being an epoxy resin.

22. The fastener of claim 20, said collar comprised of a phenolic material, said phenolic material including chopped reinforcing fibers.

* * * * *